UNITED STATES PATENT OFFICE.

SIDNEY GILCHRIST THOMAS, OF LONDON, ENGLAND.

MANUFACTURE OF ALKALINE PHOSPHATES.

SPECIFICATION forming part of Letters Patent No. 301,406, dated July 1, 1884.

Application filed January 24, 1884. (No specimens.)

*To all whom it may concern:*

Be it known that I, SIDNEY GILCHRIST THOMAS, a subject of the Queen of Great Britain and Ireland, residing at 9 Palace Chambers, Westminster Bridge, London, England, temporarily residing in the town of Algiers, Africa, have invented certain new and useful Improvements in the Manufacture of Alkalies and Phosphates; and I do hereby declare that the following is a full, clear, and exact description of the invention, which will enable others skilled in the art to which it appertains to make and use the same.

This invention relates to the manufacture of caustic alkalies and alkaline phosphates and other alkaline salts from common salt or potassic chloride. At present the manufacture of alkaline (by which I mean sodic or potassic) salts and hydrates is almost exclusively carried out by either the Leblanc process, in which salt is decomposed by sulphuric acid, the sodic sulphate formed being subsequently treated by chalk, or by the ammonia process, in which carbonic acid, lime, and ammonia are used for the conversion of the salt. In both these cases the reagents and the process employed are costly, and the by-products are obtained in a more or less useless condition. By my invention I employ the phosphorus found as an impurity in pig-iron and the oxygen of the atmosphere forming $P_2O_5$ as the decomposing-acid, neither of these ingredients costing anything, and I obtain as additional products the valuable materials phosphoric acid and steel, besides the sodic or potassic hydrate or nonhaloid alkaline-salt, which is the main product.

As an illustration of the cost of the existing processes it may be mentioned that the cost of a unit of sodium as sodic hydrate or carbonate is generally from eight to fifteen times the price of the unit of sodium in the condition of common salt.

In carrying out my process I take molten iron, preferably containing considerably over one per cent. of phosphorus. Pig containing four per cent. and more of phosphorus may be readily manufactured. The molten pig is preferably desiliconized, and to a certain extent decarburized, in an ordinary or vertical Bessemer converter, (or in some cases a pig may be used specially low in silicon,) and run in a fluid state at a very high temperature into the apparatus in which the conversion of the alkaline chloride into phosphate is effected. This apparatus may consist either of a Siemens furnace or Bessemer vessel, which must be in either case provided with a basic lining. A Siemens furnace is preferred, unless the metal is extremely hot and fluid. The furnace must have a hearth and roof of lime, or magnesian lime, or of magnesia. Before running in the metal there is spread on the hearth a considerable amount of salt, the salt being covered by a layer of limestone or lime, to prevent volatilization, and is preferably further protected by a rough cast-iron plate or casing. After the metal is run in, I blow in a further quantity of salt through an air-tuyere, which may also be mixed with lime. The total quantity of salt added must amount to over six times, and should preferably be not less than nine times, the weight of the phosphorus and silicon contained in the molten iron treated. I find it also advantageous to blow in superheated steam, water-gas, or other hydrogen-yielding substances, to facilitate the decomposition of the chloride. I also prefer to add a considerable quantity of oxide of iron to the charge, to facilitate the oxidation of the phosphorus. The operation should be continued till the whole of the phosphorus has been oxidized and removed from the bath of metal, which is ascertained by examining the fracture. The slag, consisting, chiefly, of phosphate of soda with some sodic silicate and phosphate and silicate of lime and magnesia, is run off and transferred while still hot into lixiviating-tanks, where the phosphate of soda is dissolved and the solution run into precipitating or evaporating tanks, according as it is desired to produce caustic soda or other salts of soda with phosphate of lime or phosphate of soda. A solution of caustic soda and a precipitate of phosphate of lime is produced by mixing the solution with milk of lime, while other sodic salts can be produced, if desired, by well-known means. The dephosphorized metal is finished to form steel or ingot-iron, as required, as in ordinary steel-making practice. The resulting steel will be of high quality. If I use a Bessemer converter instead of a Siemens furnace, I generally prefer to employ a converter with large side tuyeres, instead of bottom tuyeres, and I prefer to introduce the greater part of the salt through the tuyeres, that which is not so introduced being introduced either in a rough iron casing or in a lime or limestone and tar or similar casing, to prevent too rapid volatilization or a too rapid reaction. I also prefer to introduce superheated steam or hydrocarbon vapor to aid in the decomposition. A dipping central tuyere may be used to introduce the salt, instead of using bottom tuyeres for the purpose. The gases produced in the operation should be collected in a hood and passed through a condensing-tower to precipitate the chlorine and hydrochloric gases and volatilized alkaline salts carried over by them. The precipitation is best effected by water jets and spray.

Having fully described my invention, I wish it to be understood that I do not claim as part of my invention the desiliconizing of pig metal in Bessemer vessels, (this having been proposed by Leon Talabot in 1857,) nor the lining of metallurgical furnaces or converters with lime or magnesia, nor the employment of basic-lined converters or furnaces for the manufacture of steel or iron; nor do I claim, broadly, the use of salt as a flux in metallurgical operations, nor the use of salt in any metallurgical operation conducted in a vessel with a silicious lining, nor the use of small quantities of salt as a flux in the ordinary Bessemer or puddling process; nor do I claim, generally, the use of lime for precipitating phosphates from aqueous solutions; but

I claim—

1. The process for the manufacture of alkalies and phosphates, which consists in treating in a basic-lined Siemens furnace or Bessemer converter alkaline chlorides with molten phosphoric iron and an air-blast or iron oxide, washing the gases for hydrochloric acid, lixiviating the resulting phosphatic slag, and precipitating the solution with milk of lime, whereby caustic alkali and precipitated calcium phosphate are obtained.

2. The process of obtaining phosphate of soda or potash by treating their chlorides in a basic Siemens furnace or Bessemer converter in the presence of oxygen and superheated steam or other hydrogen-supplying substance with molten phosphoric iron and atmospheric oxygen or oxide of iron.

SIDNEY GILCHRIST THOMAS.

Witnesses:
L. E. THOMAS,
EVA TINDALL,
*Both of Hotel Kirsch, Algiers.*